United States Patent
El Ouair et al.

(10) Patent No.: US 8,086,426 B2
(45) Date of Patent: Dec. 27, 2011

(54) PROCESSING SEISMIC DATA REPRESENTING A PHYSICAL SYSTEM

(75) Inventors: Youness El Ouair, Tiller (NO); Arild Buland, Trondheim (NO); Ola Eiken, Trondheim (NO)

(73) Assignee: Statoil ASA, Stavanger (NO)

( * ) Notice: Subject to any disclaimer, the term of this patent is extended or adjusted under 35 U.S.C. 154(b) by 813 days.

(21) Appl. No.: 10/585,559

(22) PCT Filed: Dec. 23, 2004

(86) PCT No.: PCT/GB2004/050044
§ 371 (c)(1), (2), (4) Date: Mar. 5, 2008

(87) PCT Pub. No.: WO2008/066660
PCT Pub. Date: Jul. 21, 2005

(65) Prior Publication Data
US 2008/0195358 A1    Aug. 14, 2008

(30) Foreign Application Priority Data
Jan. 9, 2004    (GB) .................................. 0400423.0

(51) Int. Cl.
G06F 17/10    (2006.01)
(52) U.S. Cl. .................. 703/2; 703/10; 702/14; 367/21; 367/38
(58) Field of Classification Search .................. 703/2, 6, 703/10; 702/11, 13, 14, 17; 367/21, 31, 367/38
See application file for complete search history.

(56) References Cited

U.S. PATENT DOCUMENTS

| | | | |
|---|---|---|---|
| 1,818,331 A | 8/1931 | Jakosky |
| 2,077,707 A | 4/1937 | Melton |
| 2,139,460 A | 12/1938 | Potapenko |
| 2,268,106 A | 12/1941 | Blau |
| 2,426,918 A | 9/1947 | Barret |
| 2,531,088 A | 11/1950 | Thompson |
| 2,766,422 A | 10/1956 | Carbonetto |
| 2,907,389 A | 10/1959 | Hitzman |
| 2,919,397 A | 12/1959 | Morley |
| 2,953,742 A | 9/1960 | Herbold |
| 3,052,836 A | 9/1962 | Postma |
| 3,105,014 A | 9/1963 | Harrison |
| 3,113,316 A | 12/1963 | Berry |
| 3,114,875 A | 12/1963 | Haagensen |

(Continued)

FOREIGN PATENT DOCUMENTS
EP    0087271    8/1983
(Continued)

OTHER PUBLICATIONS

Brevik, "Rock model based inversion of saturation and pressure changes from time lapse seismic data," SEG 1999 Expanded Abstracts (4 pgs.).

(Continued)

*Primary Examiner* — Russell W Frejd
(74) *Attorney, Agent, or Firm* — Patterson Thuente Christensen Pedersen, P.A.

(57) ABSTRACT

A method of processing seismic data representing a physical system, the method comprising a difference between first and second seismic data representing the system in first and second states, respectively, and inverting the difference in accordance with a parameterized model of the physical system to obtain changes in the parameters of the model.

35 Claims, 7 Drawing Sheets

U.S. PATENT DOCUMENTS

| | | | |
|---|---|---|---|
| 3,182,250 A | 5/1965 | Conti et al. | |
| 3,332,487 A | 7/1967 | Jones | |
| 3,398,356 A | 8/1968 | Still | |
| 3,548,299 A | 12/1970 | Duroux et al. | |
| 3,763,419 A | 10/1973 | Barringer | |
| 3,806,795 A | 4/1974 | Morey | |
| 3,819,246 A | 6/1974 | List | |
| 3,836,960 A | 9/1974 | Gehman et al. | |
| 3,959,721 A | 5/1976 | Roschuk et al. | |
| 3,990,123 A | 11/1976 | Stachiw et al. | |
| 4,010,413 A | 3/1977 | Daniel | |
| 4,041,372 A | 8/1977 | Miller et al. | |
| 4,047,098 A | 9/1977 | Duroux | |
| 4,077,686 A | 3/1978 | Bukaitz | |
| 4,079,309 A | 3/1978 | Seeley | |
| 4,094,304 A | 6/1978 | Wright, Jr. | |
| 4,168,484 A | 9/1979 | Wright, Jr. | |
| 4,218,678 A | 8/1980 | Fowler et al. | |
| 4,229,809 A | 10/1980 | Schwalbe | |
| 4,245,191 A | 1/1981 | Schroeder | |
| 4,258,321 A | 3/1981 | Neale, Jr. | |
| 4,258,322 A | 3/1981 | Rocroi et al. | |
| 4,283,099 A | 8/1981 | Burton | |
| 4,296,379 A | 10/1981 | Yoshizumi | |
| 4,298,840 A | 11/1981 | Bischoff et al. | |
| 4,308,499 A | 12/1981 | Thierbach et al. | |
| 4,396,885 A | 8/1983 | Constant | |
| 4,417,210 A | 11/1983 | Rocroi et al. | |
| 4,446,434 A | 5/1984 | Sternberg et al. | |
| 4,451,789 A | 5/1984 | Meador | |
| 4,456,067 A | 6/1984 | Pinner | |
| 4,489,276 A | 12/1984 | Yu | |
| 4,492,924 A | 1/1985 | Nilsson | |
| 4,494,805 A | 1/1985 | Washburn | |
| 4,500,146 A | 2/1985 | Peterson | |
| 4,506,225 A | 3/1985 | Loveless et al. | |
| 4,516,226 A | 5/1985 | Peynaud et al. | |
| 4,547,733 A | 10/1985 | Thoraval | |
| 4,583,095 A | 4/1986 | Peterson | |
| 4,594,551 A | 6/1986 | Cox et al. | |
| 4,616,184 A | 10/1986 | Lee et al. | |
| 4,617,518 A | 10/1986 | Srnka | |
| 4,633,182 A | 12/1986 | Dzwinel | |
| 4,652,829 A | 3/1987 | Safinya | |
| 4,660,645 A | 4/1987 | Newlove et al. | |
| 4,677,438 A | 6/1987 | Michiguchi et al. | |
| 4,698,791 A | 10/1987 | Cunningham | |
| 4,760,340 A | 7/1988 | Denzau et al. | |
| 4,791,998 A | 12/1988 | Hempkins et al. | |
| 4,793,664 A | 12/1988 | Jackson | |
| 4,835,473 A | 5/1989 | Bostick, Jr. | |
| 4,835,474 A | 5/1989 | Parra et al. | |
| 4,906,575 A | 3/1990 | Silver et al. | |
| 4,926,394 A | 5/1990 | Doyen | |
| 4,957,172 A | 9/1990 | Patton et al. | |
| 4,986,354 A | 1/1991 | Cantu | |
| 4,992,995 A | 2/1991 | Favret | |
| 5,025,218 A | 6/1991 | Ramstedt | |
| 5,032,794 A | 7/1991 | Ridd et al. | |
| 5,039,179 A | 8/1991 | Chouzenoux | |
| 5,043,667 A | 8/1991 | Schofield | |
| 5,066,916 A | 11/1991 | Rau | |
| 5,103,920 A | 4/1992 | Patton et al. | |
| 5,170,440 A | 12/1992 | Cox | |
| 5,177,445 A | 1/1993 | Cross | |
| 5,185,578 A | 2/1993 | Stolarczykz | |
| 5,192,952 A | 3/1993 | Johler | |
| 5,219,386 A | 6/1993 | Kletzmaier et al. | |
| 5,280,284 A | 1/1994 | Johler | |
| 5,357,253 A | 10/1994 | Van Etten et al. | |
| 5,369,892 A | 12/1994 | Dhaemers | |
| 5,373,443 A | 12/1994 | Lee et al. | |
| 5,400,030 A | 3/1995 | Duren et al. | |
| D359,403 S | 6/1995 | Tisbo et al. | |
| 5,421,646 A | 6/1995 | McNamara et al. | |
| D361,446 S | 8/1995 | Acard | |
| 5,444,619 A | 8/1995 | Hoskins et al. | |
| H1490 H | 9/1995 | Thompson et al. | |
| D362,767 S | 10/1995 | Kelly et al. | |
| D366,376 S | 1/1996 | Tisbo et al. | |
| D366,577 S | 1/1996 | Tisbo et al. | |
| 5,486,764 A | 1/1996 | Thompson et al. | |
| H1524 H | 4/1996 | Thompson et al. | |
| H1561 H | 7/1996 | Thompson | |
| 5,563,513 A | 10/1996 | Tasci | |
| 5,564,806 A | 10/1996 | Keisling et al. | |
| 5,581,024 A | 12/1996 | Meyer, Jr. et al. | |
| 5,689,068 A | 11/1997 | Locatelli et al. | |
| 5,690,401 A | 11/1997 | Franklin | |
| 5,704,142 A | 1/1998 | Stump | |
| 5,724,309 A | 3/1998 | Higgs et al. | |
| 5,767,679 A | 6/1998 | Schroder | |
| 5,770,945 A | 6/1998 | Constable | |
| 5,777,478 A | 7/1998 | Jackson | |
| 5,798,892 A | 8/1998 | Kobayashi | |
| 5,798,982 A * | 8/1998 | He et al. | 367/73 |
| 5,811,973 A | 9/1998 | Meyer, Jr. | |
| 5,825,188 A | 10/1998 | Montgomery et al. | |
| 5,838,634 A | 11/1998 | Jones | |
| 5,841,280 A | 11/1998 | Yu et al. | |
| 5,877,995 A | 3/1999 | Thompson et al. | |
| 5,886,526 A | 3/1999 | Wu | |
| 5,892,361 A | 4/1999 | Meyer, Jr. et al. | |
| 5,894,450 A | 4/1999 | Schmidt et al. | |
| 5,901,795 A | 5/1999 | Tsao et al. | |
| 5,905,657 A | 5/1999 | Celniker | |
| 5,940,777 A | 8/1999 | Keskes | |
| 5,955,884 A | 9/1999 | Payton et al. | |
| 5,987,388 A | 11/1999 | Crawford et al. | |
| 5,996,414 A | 12/1999 | Mercado | |
| 6,002,357 A | 12/1999 | Redfern et al. | |
| 6,005,916 A | 12/1999 | Johnson et al. | |
| 6,011,557 A | 1/2000 | Keskes et al. | |
| 6,023,168 A | 2/2000 | Minerbo | |
| 6,026,913 A | 2/2000 | Mandal et al. | |
| 6,041,018 A | 3/2000 | Roche | |
| 6,049,760 A | 4/2000 | Scott | |
| 6,060,884 A | 5/2000 | Meyer, Jr. et al. | |
| 6,060,885 A | 5/2000 | Tabarovsky et al. | |
| 6,061,412 A | 5/2000 | Stucker et al. | |
| 6,087,833 A | 7/2000 | Jackson | |
| 6,101,448 A | 8/2000 | Ikelle et al. | |
| 6,108,605 A | 8/2000 | Doyle et al. | |
| 6,114,972 A | 9/2000 | Smith | |
| 6,140,819 A | 10/2000 | Peterman et al. | |
| 6,157,195 A | 12/2000 | Vail, III | |
| 6,163,155 A | 12/2000 | Bittar | |
| 6,181,138 B1 | 1/2001 | Hagiwara et al. | |
| 6,184,685 B1 | 2/2001 | Paulk et al. | |
| 6,188,221 B1 | 2/2001 | Van de Kop et al. | |
| 6,188,222 B1 | 2/2001 | Seydoux et al. | |
| 6,225,806 B1 | 5/2001 | Millar et al. | |
| 6,236,211 B1 | 5/2001 | Wynn | |
| 6,236,212 B1 | 5/2001 | Wynn | |
| 6,246,240 B1 | 6/2001 | Vail, III | |
| 6,294,917 B1 | 9/2001 | Nichols | |
| 6,339,333 B1 | 1/2002 | Kuo | |
| 6,389,360 B1 | 5/2002 | Alft et al. | |
| 6,415,231 B1 | 7/2002 | Hebert | |
| 6,424,918 B1 * | 7/2002 | Jorgensen et al. | 702/6 |
| 6,450,599 B1 | 9/2002 | Mamuyac | |
| 6,480,000 B1 | 11/2002 | Kong et al. | |
| 6,499,817 B2 | 12/2002 | Jermain | |
| 6,573,855 B1 | 6/2003 | Hayakawa et al. | |
| 6,628,119 B1 | 9/2003 | Eidesmo et al. | |
| 6,662,147 B1 | 12/2003 | Fournier et al. | |
| 6,696,839 B2 | 2/2004 | Ellingsrud et al. | |
| 6,700,526 B2 | 3/2004 | Witten | |
| 6,717,411 B2 | 4/2004 | Ellingsrud et al. | |
| 6,826,483 B1 | 11/2004 | Anderson et al. | |
| 6,834,732 B2 | 12/2004 | Haarstad | |
| 6,842,006 B2 | 1/2005 | Conti et al. | |
| 6,859,038 B2 | 2/2005 | Ellingsrud et al. | |
| 6,864,684 B2 | 3/2005 | Ellingsrud et al. | |
| 6,900,639 B2 | 5/2005 | Ellingsrud et al. | |
| 6,917,564 B2 | 7/2005 | Leaney | |
| 6,950,786 B1 | 9/2005 | Sonneland et al. | |

| | | | |
|---|---|---|---|
| 6,950,790 B1 | 9/2005 | Nichols | |
| 7,026,819 B2 | 4/2006 | Eidesmo et al. | |
| 7,028,806 B2 | 4/2006 | Dubinsky et al. | |
| 7,032,707 B2 | 4/2006 | Egerev et al. | |
| 7,038,456 B2 | 5/2006 | Ellingsrud et al. | |
| 7,038,850 B2 | 5/2006 | Chang et al. | |
| 7,042,802 B2 * | 5/2006 | Sinha | 367/86 |
| 7,072,767 B2 * | 7/2006 | Routh et al. | 702/14 |
| 7,095,357 B1 | 8/2006 | Johler | |
| 7,106,065 B1 | 9/2006 | Graf | |
| 7,123,543 B2 | 10/2006 | Vaage et al. | |
| 7,126,338 B2 | 10/2006 | MacGregor et al. | |
| 7,145,341 B2 | 12/2006 | Ellingsrud et al. | |
| 7,149,672 B2 | 12/2006 | Torkildsen | |
| 7,202,669 B2 | 4/2007 | Ellingsrud et al. | |
| 7,319,330 B2 | 1/2008 | Amundsen | |
| 7,423,432 B2 | 9/2008 | Amundsen | |
| 7,471,089 B2 | 12/2008 | Zerilli et al. | |
| 7,613,570 B2 | 11/2009 | Rosten et al. | |
| 7,664,603 B2 | 2/2010 | Rosten | |
| 2003/0048105 A1 | 3/2003 | Ellingsrud et al. | |
| 2003/0050759 A1 | 3/2003 | Srnka et al. | |
| 2003/0052685 A1 | 3/2003 | Ellingsrud et al. | |
| 2004/0000912 A1 | 1/2004 | Conti et al. | |
| 2004/0003511 A1 | 1/2004 | Silver | |
| 2004/0017137 A1 | 1/2004 | Straub | |
| 2004/0027130 A1 | 2/2004 | Ellingsrud et al. | |
| 2004/0090234 A1 | 5/2004 | Macune | |
| 2004/0176910 A1 | 9/2004 | Ellingsrud et al. | |
| 2005/0035696 A1 | 2/2005 | Parise et al. | |
| 2005/0040742 A1 | 2/2005 | Tsai | |
| 2005/0264294 A1 | 12/2005 | Constable | |
| 2006/0005965 A1 | 1/2006 | Chouzenoux et al. | |
| 2006/0091889 A1 | 5/2006 | Ellingsrud et al. | |
| 2006/0103387 A1 | 5/2006 | Amundsen | |
| 2006/0202697 A1 | 9/2006 | Sodal | |
| 2007/0145980 A1 | 6/2007 | Conti et al. | |
| 2007/0150201 A1 | 6/2007 | Eidesmo et al. | |
| 2007/0294036 A1 | 12/2007 | Strack et al. | |
| 2008/0065330 A1 | 3/2008 | Rosten et al. | |
| 2008/0122444 A1 | 5/2008 | Schaug-Pettersen et al. | |
| 2008/0169817 A1 | 7/2008 | Morrison et al. | |
| 2008/0189043 A1 * | 8/2008 | Anno et al. | 702/14 |
| 2008/0221795 A1 | 9/2008 | Amundsen et al. | |
| 2009/0134877 A1 | 5/2009 | Schaug-Pettersen | |
| 2009/0265111 A1 | 10/2009 | Helwig et al. | |
| 2009/0267608 A1 | 10/2009 | Johnstad et al. | |
| 2009/0271118 A1 * | 10/2009 | Saltzer et al. | 702/14 |
| 2010/0045295 A1 | 2/2010 | Mittet et al. | |
| 2010/0052688 A1 | 3/2010 | Schaug-Pettersen | |
| 2010/0057363 A1 | 3/2010 | Amundsen | |
| 2010/0061187 A1 | 3/2010 | Sodal | |

FOREIGN PATENT DOCUMENTS

| | | |
|---|---|---|
| EP | 0215695 | 3/1987 |
| EP | 0219234 | 4/1987 |
| EP | 0368762 | 5/1990 |
| EP | 0512756 | 11/1991 |
| EP | 0481886 | 4/1992 |
| EP | 0568612 | 3/1996 |
| EP | 0814349 | 12/1997 |
| EP | 1 094 338 A | 4/2001 |
| EP | 1 253 443 A1 | 10/2002 |
| EP | 1253437 | 10/2002 |
| EP | 1 255 126 A1 | 11/2002 |
| EP | 1512033 | 12/2003 |
| EP | 1309887 | 3/2004 |
| EP | 1256019 | 6/2004 |
| FR | 2479992 | 10/1981 |
| FR | 2586302 | 2/1987 |
| GB | 188676 | 12/1922 |
| GB | 1342475 | 1/1974 |
| GB | 1588495 | 4/1981 |
| GB | 2089043 | 6/1982 |
| GB | 2155182 | 9/1985 |
| GB | 2197078 | 5/1988 |
| GB | 2197952 | 6/1988 |
| GB | 220070 | 12/1989 |
| GB | 2220071 | 12/1989 |
| GB | 2231602 | 11/1990 |
| GB | 2256715 | 12/1992 |
| GB | 2296567 | 7/1996 |
| GB | 2301902 | 12/1996 |
| GB | 2323443 A | 9/1998 |
| GB | 2333364 | 7/1999 |
| GB | 2355538 | 4/2001 |
| GB | 2382875 | 7/2001 |
| GB | 2364390 | 1/2002 |
| GB | 2384068 | 7/2003 |
| GB | 2385923 | 9/2003 |
| GB | 2390904 | 1/2004 |
| GB | 2391946 | 2/2004 |
| GB | 2395563 | 5/2004 |
| GB | 2399640 | 9/2004 |
| GB | 2404444 | 2/2005 |
| GB | 2411006 | 8/2005 |
| GB | 2413187 | 10/2005 |
| GB | 2413188 | 10/2005 |
| GB | 2415511 | 12/2005 |
| GB | 2421800 | 7/2006 |
| GB | 2425182 | 10/2006 |
| JP | 2002 244580 | 8/2002 |
| JP | 2006145360 | 6/2006 |
| WO | WO 81/01617 | 6/1981 |
| WO | WO 89/10463 | 11/1989 |
| WO | WO 90/00749 | 1/1990 |
| WO | WO 92/13172 | 8/1992 |
| WO | WO 92/15771 | 9/1992 |
| WO | WO 92/15900 | 9/1992 |
| WO | WO 94/20864 | 9/1994 |
| WO | WO 96/06367 | 2/1996 |
| WO | WO 96/33426 | 10/1996 |
| WO | WO 96/35859 | 11/1996 |
| WO | WO 97/33184 | 9/1997 |
| WO | WO 98/11455 A1 | 3/1998 |
| WO | WO 98/28638 | 7/1998 |
| WO | WO 99/13966 | 3/1999 |
| WO | WO 00/00850 | 1/2000 |
| WO | WO 00/13037 | 3/2000 |
| WO | WO 00/13046 | 3/2000 |
| WO | WO 00/54075 | 9/2000 |
| WO | WO 00/63718 | 10/2000 |
| WO | WO 01/20366 | 3/2001 |
| WO | WO 01/33481 | 5/2001 |
| WO | WO 01/55749 | 8/2001 |
| WO | WO 01/57555 | 8/2001 |
| WO | WO 02/14906 | 2/2002 |
| WO | WO 03/034096 | 4/2003 |
| WO | WO 03/036331 | 5/2003 |
| WO | WO 03/042718 | 5/2003 |
| WO | WO 03/048737 | 6/2003 |
| WO | WO 03/048812 | 6/2003 |
| WO | WO 03/100467 | 12/2003 |
| WO | WO 03/104844 | 12/2003 |
| WO | WO 01/42818 | 6/2004 |
| WO | WO 2004/053528 | 6/2004 |
| WO | 2004/083898 | 9/2004 |
| WO | WO 2007/018810 | 2/2007 |

OTHER PUBLICATIONS

Rutledal et al., "Time-Lapse Elastic Inversion at the Oseberg Field," EAGE 64th Conference & Exhibition—Florence Italy May 27-30, 2002 (4 pgs.).

Varela et al., "Assessing dynamic reservoir behavior with time-lapse pre-stack 3D seismic data: a sensitivity study based on inversion," EAGE 64th Conference & Exhibition—Florence Italy May 27-30, 2002 (4 pgs.).

Minkoff et al., "Reservoir characterization via time-lapse prestack seismic inversion," 1998 SEG Expanded Abstracts (4 pgs.).

"Applications of 3-Dimensional Electromagnetic Induction by Sources in the Ocean", A proposal submitted to MAST III under Area C: Marine Technology, Part 1.

"Applications of 3-Dimensional Electromagnetic Induction by Sources in the Ocean", A proposal submitted to MAST III under Area C: Marine Technology, Part 2.

0119245.9; GB Search Report dated May 28, 2002.

Barton et al., "LITHOS", Cambridge Advanced Lithological Imaging Project Phase 1: 1998-2001 Sub-basalt Imaging, Aug. 21, 1997.
Chave et al., "Controlled Electromagnetic Sources for Measuring Electrical Conductivity Beneath the Oceans 1", Forward Problem and Model Study, J. Geophysical Research, vol. 87, No. B7, pp. 5327-5338, Jul. 10, 1982.
Chave et al., *"Some Comments on Seabed Propagation of ULF/ELF Electromagnetic Fields"*, 25 Radio Science 825-36 (Sep. 1990).
Cheesman et al., "On the theory of sea-floor conductivity mapping using transient electromagnetic systems", Geophysica, vol. 52. No. 2. Feb. 1987 pp. 204-217.
Constable et al., "Marine controlled-source electomagnetic sounding 2. The PEGASUS experiment" Journal of Geophysical Research. 101.B3 (1996): 5519-5530.
Constable et al., Marine Magnetotellurics for petroleum exploration, Part 1: A sea-floor equipment system. Geophysics 63(3) 816-825. (May-Jun. 1998).
DAS.,"Apparent resistivity curves in controlled-source electromagnetic sounding directly reflecting true resistivities in a layered earth" vol. 60, No. 1, pp. 53-60 (Jan.-Feb. 1995).
Edwards et al., "Electromagnetic Assessment of Offshore Methane Hydrate Deposits in the Cascadia Margin", MARELEC 99, 1999.
Edwards et al., "The Assessment of Marine Gas Hydrates through Electrical Remote Sounding: Hydrate without a BSR", Geophysical Research Letters, vol. 27, No. 16, pp. 2397-2400, Aug. 15, 2000.
Edwards, *"On the Resource evaluation of Marine Gas Hydrate Deposits Using Sea-Floor Transient Electric Dipole-Dipole Methods"*, 62 Geophysics 63-74 (Jan. 1997).
Eidesmo et al., "Remote detection of hydrocarbon filled layers using marine controlled source electromagnetic sounding," EAGE 64$^{th}$ Conference & Exhibition—Florence, Italy, 4 pages, May 27-30, 2002.
Eidesmo et al., *"Sea Bed Logging (SBL), a new method for remote and direct identification of hydrocarbon filled layers in deepwater areas"*, 20 First Break (Mar. 2002).
Ellingsrud et al., *"How Electromagnetic Sounding Technique Could be Coming to Hydrocarbon E & P"*, 20 First Break (Mar. 2002).
Ellingsrud et al., "Remote sensing of hydrocarbon layers by seabed logging (SBL): Results from a cruise offshore Angola," The Leading Edge, pp. 972-982, Oct. 2002.
Evans et al, Upper Crustal Resistivity Structure of the East-Pacific Rise Near 13 degrees North, Geophysical Research Letters, vol. 18, No. 10, pp. 1917-1920, Oct. 1991.
Evans et al., "On the Electrical Nature of the Axial Melt Zone at 13 degrees North on the East Pacific Rise", Journal of Geophysical Research, vol. 99, No. B1, pp. 577-588, Jan. 1994.
Evans, Constraints on the Large-Scale Porosity and Permeability Structure of Young Oceanic Crust from Velocity and Resistivity Data, Geophysical Journal International, vol. 119, pp. 869-879, 1994.
Explorations, Scripps Institute of Oceanography, vol. 4, No. 2, 1997.
Flosadottir et al., "Marine Controlled-Source Electromagnetic Sounding 1. Modeling and Experimental Design", Journal of Geophysical Research, vol. 101, No. B3, pp. 5507 to 5517, Mar. 10, 1996.
Garg et al., *"Synthetic Electric Sounding Surveys Over Known Oil Fields"*, 49 Geophysics 1959-67 (Nov. 1984).
Greaves et al., New Dimensions of Geophysics for Reservoir Monitoring, pp. 141-150.
Greer et al., "Remote mapping of hydrocarbon extent using marine Active Source EM Sounding," EAGE 65$^{th}$ Conference & Exhibition—Stavanger, Norway, 4 pages, Jun. 2-5, 2003.
Hordt et al., "A First Attempt at Monitoring Underground Gas Storage by Means of Time-lapse Multi-Channel Transient Electromagnetics", Geophysical Prospecting, vol. 48(3), pp. 489-509, 2000.
Hoversten et al., Maring magnetotellurics for petroleum exploration, Part II: numerical analysis of subsalt resolution. Geophysics 63(3): 826-840 (May-Jun. 1998).
International Search Report—PCT/EP2008/050200 dated Nov. 24, 2008.
International Search Report PCT/EP2005/051480 Aug. 24, 2005 and Search Report 0407699.8 dated Sep. 9, 2004.
International Search Report dated Mar. 28, 2003 and International Preliminary Examination Report dated Dec. 9, 2003 for PCT/GB02/05355.
International Search Report dated Dec. 11, 2007 for PCT/2007/003484 and Search Reports dated Jan. 8, 2007 for GB 0618238.0.
International Search Report dated Jul. 28, 2005 for PCT/EP2005/051483 and GB 0407697.2 dated Sep. 14, 2004.
International Search Report dated Aug. 1, 2005 for PCT/EP2005/051484 and Search Report dated Sep. 9, 2004 from GB 0407696.4.
International Search Report dated Oct. 13, 2004for PCT/GB2004/003267 and Search Report dated Nov. 10, 2004 for GB0317649.2.
International Search Report dated Mar. 14, 2006 for PCT/GB2005/000282 and GB 0502064.9 dated May 24, 2005.
International Search Report dated Feb. 3, 2006 for PCT/GB2005/004626 and GB 0426505.4 dated Apr. 6, 2005.
International Search Report dated Apr. 17, 2008 or PCT/GB2007/003464 and Search Reports for GB 0618240.6 dated Jan. 22, 2007 and Mar. 22, 2007.
International Search Report dated Dec. 9, 2008 for PCT/GB2007/003880 and Search Reports for GB 0620328.5 dated May 18, 2007 and Jan. 26, 2007.
International Search Report dated Aug. 30, 2005 PCT/EP2005/052781 and Search Report GB0414373.1 dated Oct. 14, 2004.
ISR dated Mar. 5, 2009 , Written Opinion, Preliminary Report on Patentability for PCT/GB2007/002138 and Search Report GB 0611497.9 dated Oct. 17, 2007.
Kaufman et al., "Marine Electromagnetic Prosepecting System", 1981 Annual Meeting. Abstracts. 1 page.
Kaufman et al., *"EM Field of an Electric Dipole on the Surface of a Medium Containing a Thin Resistant Layer"*, Frequency and Transient Soundings, publ. Elsevier, (1983).
LITHOS Cambridge advanced lithological imaging project. Aug. 21, 1997.
MacGregor et al. "Use of Marine Controlled Source Electromagnetic Sounding for sub-basalt exploration" EAGE 61st conference and Technical Exihibition,Apr. 2008. Finland. Jun. 1999.
MacGregor et al., "Electromagnetic Evidence for a Crustal Melt Accumulation Beneath the Slow Spreading Reykjanes Ridge", Abstract for 13.sup.th Workshop on EM Induction in the Earth.
MacGregor et al., *"Marine Controlled Source Electromagnetic Sounding: Development of a Regularized Inversion for 2-Dimensional Resistivity Structures"*, 1 LITHOS Science Report 103-109 (Apr. 1999).
MacGregor et al., "Marine Controlled Source Electromagnetism: Effect of Source-Receiver Geometry on the Response of 1-D models", 1996.
MacGregor et al., *"The RAMESSES Experiment—III. Controlled-Source Electromagnetic Sounding of the Reykjanes Ridge"*, 135 Geophys. J. Int. 773-89 (Jul. 1998).
MacGregor et al., Electrical resistivity structure of the Valu Fa Ridge, Lau Bain, from marine controlled-source electromagnetic sounding, Geophysical Journal International. 146.1 (2001): 217-236.
MacGregor, "Electromagnetic Investigation of the Reykjanes Ridge Near 58° North", PhD Thesis, University of Cambridge.
MacGregor, "Joint analysis of marine active and passive source EM data for sub-salt or sub-basalt imaging," EAGE 65$^{th}$ Conference & Exhibition—Stavanger, Norway, 4 pages, Jun. 2-5, 2003.
Mittet, R., et al., "Inversion of SBL data acquired in shallow waters," paper presented at EAGE 66th Conference & Exhibition, 5 pgs., (Jun. 6-10, 2004).
Mittet, Rune, et al., On the orientation and absolute phase of marine CSEM receivers, Geophysics, vol. 72 No. 4 pp. F145-F155 (Jul.-Aug. 2007).
Nekut et al., "Petroleum Exploration Using Controlled Source Electromagnetic, Methods", Proceedings of the IEEE, vol. 77(2), pp. 338-362, 1989.
Opderbecker, At-Sea Calibration of a USBL Underwater Vehicle Positioning System, Oceans 97 Conference Proceedings Halifax, NS, Canada, MTS/IEEE vol. 1 pp. 721-726 (Oct. 1997).
Osen et al., Removal of water-layer multiples from multicomponenet sea-bottom data. Geophysics. vol. 64, No. 3. pp. 838-851. May-Jun. 1999.

Peyronnet et al., "POSIDONIA 6000: A New Long Range Highly Accurate Ultra Short Base Line Positioning System" Oceans 98 Conference Proceedings, Nice, France IEEE, vol. 3, pp. 1721-1727 (Sep. 1998).
Preliminary Examination Report—PCT/GB01/03473 mailed Apr. 24, 2002.
Preliminary Examination Report—PCT/GB99/02823 dated Dec. 5, 2000.
GB Search Report—PCT/GB 0119245.9 dated May 28, 2002.
Preliminary Examination Report—PCT/GB00/04667 dated Jan. 29, 2002.
Preliminary Examination Report—PCT/GB99/03039 dated Oct. 10, 2000.
Roston et al., (2003) A Seabed Logging Calibration Survey over the Ormen Lange Gas Field, Eage, 65th An. Intern. Mtg. Eur.Assoc. Geosc.Eng.Extended Abstracts P058.
Search Report—PCT/GB00/04667 dated Mar. 9, 2001.
Sinha et al., "*Evidence for Accumulated Melt Beneath the Slow-Spreading Mid-Atlantic Ridge*," 355 Phil. Trans. R. Soc. Lond. A 233-53 (Jan. 1997).
Sinha et al., "An Active Source Electromagnetic Sounding System for Marine Use", Marine Geophysical Researches, 12:59-68, 1990.
Sinha et al., "*Magmatic Processes at Slow Spreading Ridges: Implications of the RAMESSES Experiment at 57 deg. 45 'N on the Mid-Atlantic Ridge*," 135 Geophys. J. Int. 731-45 (Jul. 1998).
Sinha et al., "Sub-Sea-Floor Imaging for Structural and Lithological Properties Using Controlled Source Electromagnetic (CSEM) Sounding", Abstract for Technology for Deep-Sea Geological Investigations, Developments, Applications and Results, Nov. 11-12, 1998.
Sinha., "Controlled Source EM sounding: Survey design considerations for hydrocarbon applications" LITHOS Science Report. Apr. 1999: 95-101.
Slob, "Wave field decomposition of full-polarimetric data based on the two-way wave equation," Grounds Penetrating Radar, Proceedings of the 10$^{th}$ Int'l Conference on Delft, The Netherlands, Jun. 21-24, 2004, vol. 1 pp. 315-318 (Jun. 21, 2004).
Spies, "Recent Developments in the use of Surface Electrical Methods for Oil and Gas Exploration in the Soviet Union", Geophysics, vol. 48(8), pp. 1102-1112, 1983.

Strack et al., "Integrating Long-Offset Transient Electromagnetics (LOTEM) with Seismics in an Exploration Environment", Geophysical Prospecting, vol. 44, pp. 997-1017, 1996.
Unsworth et al., "Electromagnetic Induction by a Finite Electric Dipole Source Over a 2-D Earth", Geophysics, vol. 58, pp. 198-214, 1993.
Unsworth, "Electromagnetic Exploration of the Oceanic Crust with Controlled-Sources", Chptr 5, Insight into Induction, PhD Thesis, University of Cambridge, 1991.
Ursin, "Review of elastic and electomagnetic wave propagation in horizontally layered media" Geophysics. vol. 48, No. 8. pp. 1063-1081. Aug. 1983.
Young et al., "Electromagnetic Active Source Sounding Near the East Pacific Rise" Geophysical Research Letters. vol. 8, No. 10. pp. 1043-1046. Oct. 1981.
Yuan et al., "Electromagnetic Assessment of Offshore Methane Hydrate Deposits on the Cascadia Margin, GP22A-08", American Geophysical Union Fall Meeting, San Francisco, 1998.
Yuan et al., "*The Assessment of Marine Gas Hydrates Through Electrical Remote Sounding: Hydrate Without a BSR?*", 27 Geophys. Res. Letts. 204-217 (Aug. 15, 2000).
Application and File History of U.S. Appl. No. 11/287,893, filed Nov. 28, 2005, inventor Eidesmo as available at www.uspto.gov.
Application and File History of U.S. Appl. No. 11/585,992, filed Oct. 24, 2006, inventor Ellingsrud as available at www. uspto.gov.
Application and File History of U.S. Appl. No. 11/585,991, filed Oct. 24, 2006, inventor Ellingsrud as available at www.uspto.gov.
Application and File History of U.S. Appl. No. 12/304,073, filed Mar. 10, 2009, inventor Ellingsrud, as available at www.uspto.gov.
Application and File History of U.S. Appl. No. 12/441,632, filed Sep. 24, 2009, inventor Mittet, as available at www.uspto.gov.
Application and File History of U.S. Appl. No. 12/443,189, filed Dec. 30, 2009, inventor Ridyard, as available at www.uspto.gov.
Application and File Wrapper of U.S. Appl. No. 61/298,582, filed Jan. 27, 2010, inventor Perryman, as available at www.uspto.gov.
Application and File History for U.S. Appl. No. 13/015,138, filed Jan. 27, 2011, inventor Perryman et al., as available at www.uspto.gov.

* cited by examiner

PROCESSING SEISMIC DATA REPRESENTING A PHYSICAL SYSTEM

FIELD OF THE INVENTION

The present invention relates to processing seismic data representing a physical system. Such processing may be used in data inversion and a particular example of this is the inversion of time-lapse seismic data.

BACKGROUND OF THE INVENTION

Seismic reflection is a technique used to determine details of structures beneath the surface of the Earth. The resolution that may be achieved makes this technique the method of choice for oil exploration and mapping of subsurface rock structures. It is also applicable to experimental research that probes the fine structure within the Earth's crust and at the crust-mantle boundary.

The technique involves generating downward-propagating seismic waves in succession at a number of locations within the region being explored. A large number of receivers are positioned at intervals away from each source location and these receivers record the amplitudes (for example, in terms of pressure, displacement or its derivative) of seismic waves reflected back up to the surface from subsurface inhomogeneities over a period of time. The recorded waves are usually deconvolved, removing the effects of the source and receiver (which have their own response functions).

Reflection data typically have low amplitudes and are contaminated by multiple reflections and other kinds of noise. Various acquisition and processing techniques may be used to improve signal-to-noise ratios, such as averaging (stacking) of traces with the same midpoint, taking into account different distances between source and receiver, and discrimination of multiple reflections based on either their periodicity or wavefront angles which differ from the primary reflections. Further, the data may be correctly positioned in space by a process called migration, which moves dipping events into their correct position. When comparisons are made between two or more datasets over the same area, careful analysis between the amplitude, time and other attributes of the datasets may be made.

After the appropriate corrections, which may further include correction for other known environmental variables, the data are combined to provide a graphical representation of the subsurface inhomogeneities.

Seismic reflection data obtained by field experiments are then processed to obtain a three dimensional image of subsurface structures as described above. The three dimensions refer to the spatial dimensions "illuminated" by the seismic data. The vertical axis may represent depth or two-way vertical seismic wave travel time.

The amplitudes of reflected seismic waves are indicative of the subsurface reflection strengths, contaminated by noise. The reflection strength depends upon the reflection coefficient, which may be defined as a function of the relative contrasts of the elastic material properties of the subsurface layers.

The elastic properties of an isotropic, elastic medium are completely described by three parameters, for example the two elastic Lamé parameters and the density. Other parameterisations are possible, for example acoustic impedance, shear impedance and density. A third example is P-wave velocity, S-wave velocity, and density. The transformation between different sets of elastic parameters is well defined and straightforward.

In general, the elastic properties vary spatially. In order to explain the relationship between the elastic properties and the seismic data it may be convenient to imagine the subsurface as a stack of geological layers. The layer properties are described by the elastic properties of the rocks within the layers while the seismic data are related to the contrasts of the layer properties between successive layers. The seismic data are therefore suitable for interpreting subsurface layer structures since they image the boundaries between the layers.

Seismic inversion is defined herein as the process of transforming (inverting) seismic reflection data to elastic material properties, i.e. taking amplitudes (measurements of contrasts) and using them to infer physical layer properties. Numerous different seismic inversion techniques are known.

Over a period of time, certain types of rock, known as source rocks, will produce hydrocarbons. The produced hydrocarbons are then transferred to and stored in rocks known as reservoir rocks through various geological processes. During production of hydrocarbons in a subsurface region, the effective elastic material properties of the reservoir rocks change with production time, where production time is the fourth dimension in seismic 4D analysis. The changes of the effective elastic properties of the reservoir rocks may be caused by changes of the pore fluid saturations in the reservoir rocks, but also by pressure and temperature changes. Explained by a simple layer-based earth model concept, the properties of the reservoir layer are changed during production, implying changes in the reflectivity for the upper and lower reservoir interfaces. The measurements taken at a further seismic survey are related to the new contrasts at the boundaries between adjacent layers.

Reservoir changes are often inferred from a comparison of the seismic data (e.g. amplitudes of seismic waves reflected at interfaces bounding or within the reservoir) for different seismic surveys acquired at different stages of the production. A more direct interpretation can be based on difference data. Difference data are established by subtracting two time-separated seismic surveys covering a common part of the earth. The difference data, after the proper time-alignment during pre-processing, represent a spatial image of the changes of the relative contrasts between the two different acquisition times.

For a three dimensional seismic dataset, the classic inversion problem is to estimate the elastic material parameters from the three dimensional seismic data. A natural extension of 3D inversion to inversion of time-lapse seismic data (4D) is to invert the different 3D datasets separately by a known method, and then subtract the results to obtain the changes.

However, the reliability of 4D interpretations is difficult to assess, and are made by qualitative assessment. A full consideration of the uncertainties involved is important for making an accurate inference of the changes in the reservoir properties between the two seismic surveys. The results of such seismic analysis may be important in reservoir management in that the inferred reservoir properties are used to evaluate, for example, new drilling targets and future drainage strategies.

Seismic inversion provides quantitative estimates of the elastic reservoir properties. However, inversion of noisy seismic data is known to be a difficult and ill-posed procedure. An appropriate assessment of the uncertainties in 4D inversion data has not previously been possible.

Commercial time-lapse inversion techniques have become available, but only with brief descriptions of the methods. Some results have been published (Mesdag et al, 2003, Integrated AVO reservoir characterisation and time-lapse analysis of the Widuri field, $65^{th}$ Mtg., Eur., Assn. Expl. Geophys., Extended Abstracts). Such methods apply separate inversions of the data with some constraint between the results, e.g. a common background model. The time-lapse change is then calculated from the change in inverted parameters. Sarkar et al, 2003, On the Inversion of time-lapse seismic data, 73$^{rd}$ Ann. Internat. Mtg.: Soc. Of Expl. Geophys., 1489-1492, mentions inversion of seismic differences, but provides no detail of the implementation. None of these inversion techniques provide uncertainty bounds on the results.

SUMMARY OF THE INVENTION

According to a first aspect of the invention, there is provided a method as defined in the appended claim 1.

Further aspects and embodiments of the invention are defined in the other appended claims.

It is thus possible to provide a technique which permits improved inversion of seismic data representing a physical system. Such a technique may be used to handle errors intrinsic to such data and can provide, for example, probability distributions or uncertainty bounds on the results of inversion.

BRIEF DESCRIPTION OF THE FIGURES

For a better understanding of the present invention and in order to show how the same may be carried into effect, preferred embodiments of the invention will now be described, by way of example, with reference to the accompanying drawings in which.

DETAILED DESCRIPTION

The embodiments of the present invention relate to a method of data inversion that operates directly on seismic difference data, and in particular to the difference between two sets of measured data representing a system in first and second states. In the embodiments described herein, the inversion method estimates the changes of the elastic material properties of a region of the Earth containing a hydrocarbon reservoir due to production or removal of hydrocarbons. The techniques can be based on both isotropic and anisotropic models, provided that the reflections may be expressed linearly. The inversion method gives estimates of the changes in the parameters of the model, in addition to the corresponding uncertainty. The solution is obtained by combining the information provided by difference data with knowledge obtained prior to inversion. The solution is therefore more robust and less vulnerable to instabilities. Working on difference data rather than inverting the measured data prior to taking the difference is advantageous with respect to uncertainty estimation in that it allows a correct quantitative statistical treatment of the uncertainties, eliminating the need for qualitative interpretation.

To assess the uncertainty of inversion results, the inversion process is cast in a statistical setting. The solution of an inverse problem is not limited to a single best-fitting set of model parameters, but also characterises the uncertainty of the inversion results. A Bayesian setting is chosen for the inversion, although other methods, e.g. least squares, can also be used to solve the inversion problem. In a Bayesian setting it is possible to combine available prior knowledge with the information contained in the measured data. The solution of a Bayesian inverse problem is represented by the posterior distribution, which addresses all questions of nonuniqueness and uncertainty. In particular, a Gaussian posterior distribution is completely characterised by a posterior expectation and a posterior covariance.

A model of the earth for the region under consideration is defined, characterised by parameters describing the elastic material properties. The embodiments of the present invention implement a forward modelling operator, the details of which shall now be described.

As described above, an isotropic elastic medium may be fully described using a set of three parameters. The embodiments described below adopt the P-wave velocity $\alpha(x, t)$, the S-wave velocity $\beta(x, t)$ and the density $\rho(x, t)$ as the parameterisation variables, where x is the lateral location and t is the two-way vertical seismic wave travel time. An alternative parameterisation which may be used takes the acoustic impedance $Z_P = \alpha\rho$, the shear impedance $Z_S = \beta\rho$, and the density $\rho$ as the parameterisation variables instead.

The weak contrast reflectivity function r for PP reflections can be written as $$r(x, t, \theta) = a_\alpha(x, t, \theta)\frac{\partial}{\partial t}\ln\alpha(x, t) + a_\beta(x, t, \theta)\frac{\partial}{\partial t}\ln\beta(x, t) + a_\rho(x, t, \theta)\frac{\partial}{\partial t}\ln\rho(x, t),$$

where $\theta$ is the reflection angle, $a_\alpha = (1+\tan^2\theta)/2$, $a_\beta = -4(\beta/\alpha)^2\theta$, and $a_\rho = (1-4(\beta/\alpha)^2\sin^2\theta)/2$. The values of $a_\alpha$, $a_\beta$ and $a_\rho$ are defined in accordance with a known prior background model of the region under consideration. For zero-incidence reflections, this reduces to $$r(x, t, 0) = \frac{1}{2}\frac{\partial}{\partial t}\ln Z_P(x, t).$$

The techniques described herein are with reference to PP reflections, but the inversion is equally applicable to other types of reflection, including PS and SDS reflections, and in general to all linear expressions of reflectivity.

A model parameter vector m can be defined as $$m(x,t) = [\ln \alpha(x,t), \ln \beta(x,t), \ln \rho(x,t)]^T,$$

where T denotes transpose such that m(x,t) is a column vector. A further row vector a is defined as $$a(x,t,\theta) = [a_\alpha(x,t,\theta), a_\beta(x,t,\theta), a_\rho(x,t,\theta)]$$

such that the reflectivity function given above may be defined by the dot product $$r(x, t, \theta) = a(x, t, \theta) \cdot \frac{\partial}{\partial t}m(x, t).$$

A discrete representation of the reflectivity r in a given time window for a given set of reflection angles can then be written as a vector $$r(x) = A(x) \cdot \frac{\partial}{\partial t}m(x),$$

where A(x) is a sparse matrix defined by a(x,t,θ) and m(x) is a discrete representation of the model parameters in location x.

The seismic data s can be represented by the convolutional model $$s(x,t,\theta) = \int w(\tau,\theta) r(x,t-\tau,\theta) d\tau + e(x,t,\theta),$$

where w is the seismic wavelet and e is an error term. The wavelet may be angle-dependent, but independent of the lateral position x. The wavelet is assumed to be stationary within a limited target window. A seismic angle gather at location x can therefore be written, using all of the above, as $$s(x) = WA(x)Dm(x) + e(x),$$

where W is a matrix representation of the angle-dependent wavelets, A(x) is the sparse matrix defined by a above, and D is merely a differential operator representing partial differentiation (with respect to time) of the material parameters. This may be written in more compact notation by defining the forward modelling operator $G(x) = WA(x)D$ to give a description of a seismic angle gather at location x of $$s = Gm + e.$$

Figure 1:
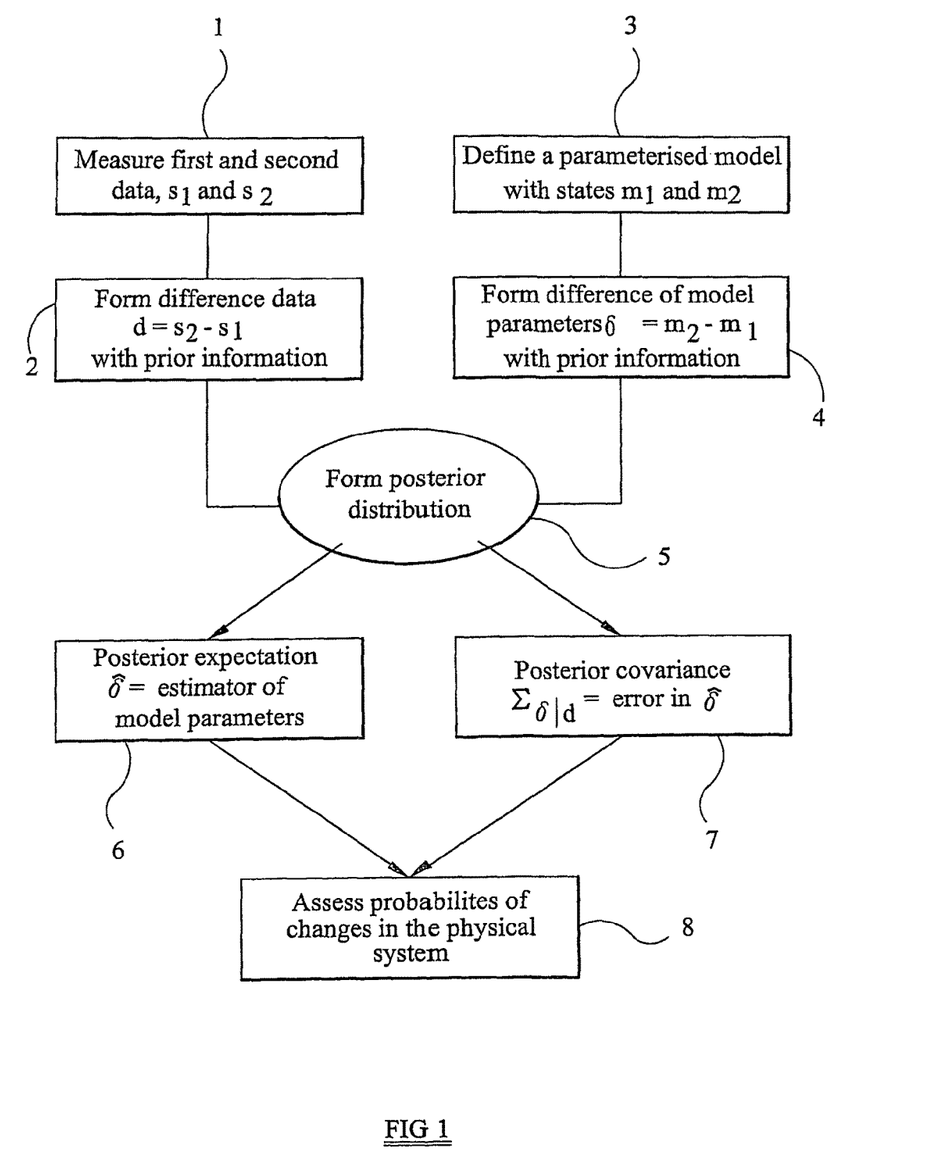
FIG. 1 is a flow diagram illustrating a method constituting an embodiment of the present invention.

Seismic data is obtained from the region under consideration on two separate occasions, shown at step 1 in the flow diagram of FIG. 1. Difference data is formed by subtracting a first (baseline) seismic dataset $s_1$ from a subsequent (repeat) seismic dataset $s_2$, shown at step 2 of FIG. 1. The method described herein may be applied to both the difference of pre-stack seismic data, and the difference of fully stacked or partially stacked data. The seismic difference data is discrete and is represented on a seismic grid. A seismic difference vector d is defined as a collection of seismic difference data from a set of grid locations, and is represented as $d = s_2 - s_1$.

The spatially distributed model parameters are represented on a grid covering the region under consideration, using a model parameter vector m containing a collection of the model parameters from a set of grid locations, such as those defined above in terms of the P and S-wave velocities and density. The model grid should cover the region of seismic data collection (the seismic grid), but the two do not need to entirely coincide. In most cases, however, coinciding grids would be a preferable choice. The embodiments described herein refer to coinciding grids. The step of defining a parameterised model is shown at step 3 of FIG. 1.

A model parameter change vector is defined as the difference between the model parameter vector $m_2$ corresponding to the repeat dataset and the model parameter vector $m_1$ corresponding to the first dataset, that is $\delta = m_2 - m_1$, corresponding to step 4 of FIG. 1.

The model parameter change vector δ may be defined (for constant x), using the parameterisation above, as $$\delta(x,t) = \left[ \ln\frac{\alpha_2(x,t)}{\alpha_2(x,t)}, \ln\frac{\beta_2(x,t)}{\beta_1(x,t)}, \ln\frac{\rho_2(x,t)}{\rho_1(x,t)} \right]^T,$$

where the indexes 1 and 2 refer to the first and second seismic data gathers respectively. For zero-incidence reflections, this reduces to $$\delta(x,t) = \ln\frac{Z_{P,2}(x,t)}{Z_{P,1}(x,t)},$$

where $Z_{P,i} = \alpha_i \rho_i$ is the acoustic impedance at time i.

A linear relationship between the model parameter change vector and the seismic data difference vector can be written in matrix-vector notation as $$d = G\delta + e,$$

where G is the forward modelling operator G(x) defined above, and e is the error term being related directly to the difference data d. The formulation of this inversion problem represents a new approach to the inversion of time-lapse seismic data.

The error term e is predominantly a consequence of seismic noise which may be characterized with an error expectation vector and an error covariance matrix $\Sigma_e$. The error expectation vector is here set to be a zero vector. The error covariance matrix $\Sigma_e$ specifies the variance for each of the elements in the error term vector e, and the correlations between the different elements therein. The error covariance matrix can be estimated from the seismic difference data in regions not influenced by the production under consideration, which is not possible unless data are differenced. The error expectation and error covariance are determined prior to the inversion.

The knowledge and uncertainty about the model parameter change vector δ prior to the inversion are characterized via a model parameter change expectation vector $\mu_\delta$ and a model parameter change covariance matrix $\Sigma_\delta$. The model parameter change expectation vector and the model parameter change covariance matrix are specified prior to inversion, and can be determined by analysis of the effects of fluid substitution and pressure changes due to production. In regions not affected by production, the model parameter change expectation is zero (no change is expected). The model change parameter covariance matrix specifies the variance for each of the elements $\ln(\alpha_2/\alpha_1)$, $\ln(\beta_2/\beta_1)$, $\ln(\rho_2/\rho_1)$ in the model parameter change vector, and the correlations therebetween.

Explicit analytical expressions are calculated for a solution in which the prior model is combined with the information provided by the seismic difference data by forming a posterior distribution, shown at step 5 of FIG. 1. The solution is represented via an updated model parameter change expectation vector, step 6 of FIG. 1, and an updated model parameter change covariance matrix, step 7 of FIG. 1. The updated model parameter change expectation vector provides an estimator of the change in material properties, and thus allows quantitative inferences on the nature of the change to be made. The uncertainty is represented via this updated covariance matrix. The analytical explicit expressions for the solution provide a computationally fast inversion method which allows for the assessment of the likelihood of changes in the physical system, shown at step 8 of FIG. 1.

The statistical properties of the model parameters are assumed to be Gaussian, although any other statistical distribution, e.g. the Cauchy distribution, may be used. If each single parameter is assumed to be Gaussian defined by an expectation value and a variance, then the model parameter change vector δ is Gaussian, defined by the model parameter change expectation vector and the model parameter change covariance matrix:

$$\delta \sim N_{n_m}(\mu_\delta, \Sigma_\delta).$$

where $n_m$ is the dimension of the model parameter change vector, and $\mu_\delta$ and $\Sigma_\delta$ are as defined above.

The statistical properties of the noise are also assumed to be Gaussian. If each single seismic noise sample is assumed to be Gaussian defined by an expectation value and a variance, then a vector of noise samples is Gaussian defined by an error expectation vector and an error covariance matrix as described above:

$$d|\delta \sim N_{n_d}(G\delta, \Sigma_e),$$

where $n_d$ is the dimension of the difference data vector d, and G, $\delta$ and $\rho_e$ are as described above.

These two distribution models therefore imply that the distribution for the seismic difference data is also Gaussian:

$$d \sim N_{n_d}(\mu_d, \Sigma_d),$$

with a difference expectation vector $\mu_d = G\mu_\delta$ and difference covariance matrix $\Sigma_s = G\Sigma_\delta G^T + \Sigma_e$.

Suppressing the location parameter x, the joint distribution for the model parameter change vector $\delta$ and the seismic difference data vector d is then:

$$\begin{bmatrix} \delta \\ d \end{bmatrix} \sim N_{n_m+n_d}\left(\begin{bmatrix} \mu_\delta \\ \mu_d \end{bmatrix}, \begin{bmatrix} \Sigma_\delta & \Sigma_\delta G^T \\ G\Sigma_\delta & \Sigma_d \end{bmatrix}\right).$$

Under the described Gaussian assumptions for the prior model and the seismic noise, the solution is represented via the multi-Gaussian distribution:

$$\delta|d \sim N_{n_m}(\mu_{\delta|d}, \Sigma_{\delta|d}),$$

defined by the new combined expectation and covariance. In this case, the expectation vector represents an optimal solution for the 4D inversion problem. In Bayesian terminology, this is the posterior distribution with a posterior expectation of $$\mu_{\delta|d} = \mu_\delta + \Sigma_\delta G^T \Sigma_d^{-1}(d - \mu_d)$$

and a posterior covariance of $$\Sigma_{\delta|d} = \Sigma_\delta - \Sigma_\delta G^T \Sigma_d^{-1} G\Sigma_\delta.$$

The posterior expectation is an optimal estimator for $\delta$ calculated from the difference data d, such that $$\hat{\delta} = \mu_{\delta|d},$$

while the uncertainty is represented by the posterior covariance matrix.

The posterior estimator $\hat{\delta}$ is an estimator for $\ln(\alpha_2/\alpha_1)$, $\ln(\beta_2/\beta_1)$ and $\ln(\rho_2/\rho_1)$. In the poststack case, given zero incidence reflections, $\hat{\delta}$ is an estimator for $\ln(Z_{P,2}/Z_{P,1})$. Therefore $\hat{\delta}$ gives a quantitative estimate of the change in material properties, and the corresponding posterior covariance matrix gives its uncertainty. These two quantities may then be used to infer changes in production in the reservoir, and other related reservoir properties.

The method of the above embodiment will now be illustrated by way of example.

Figure 2:
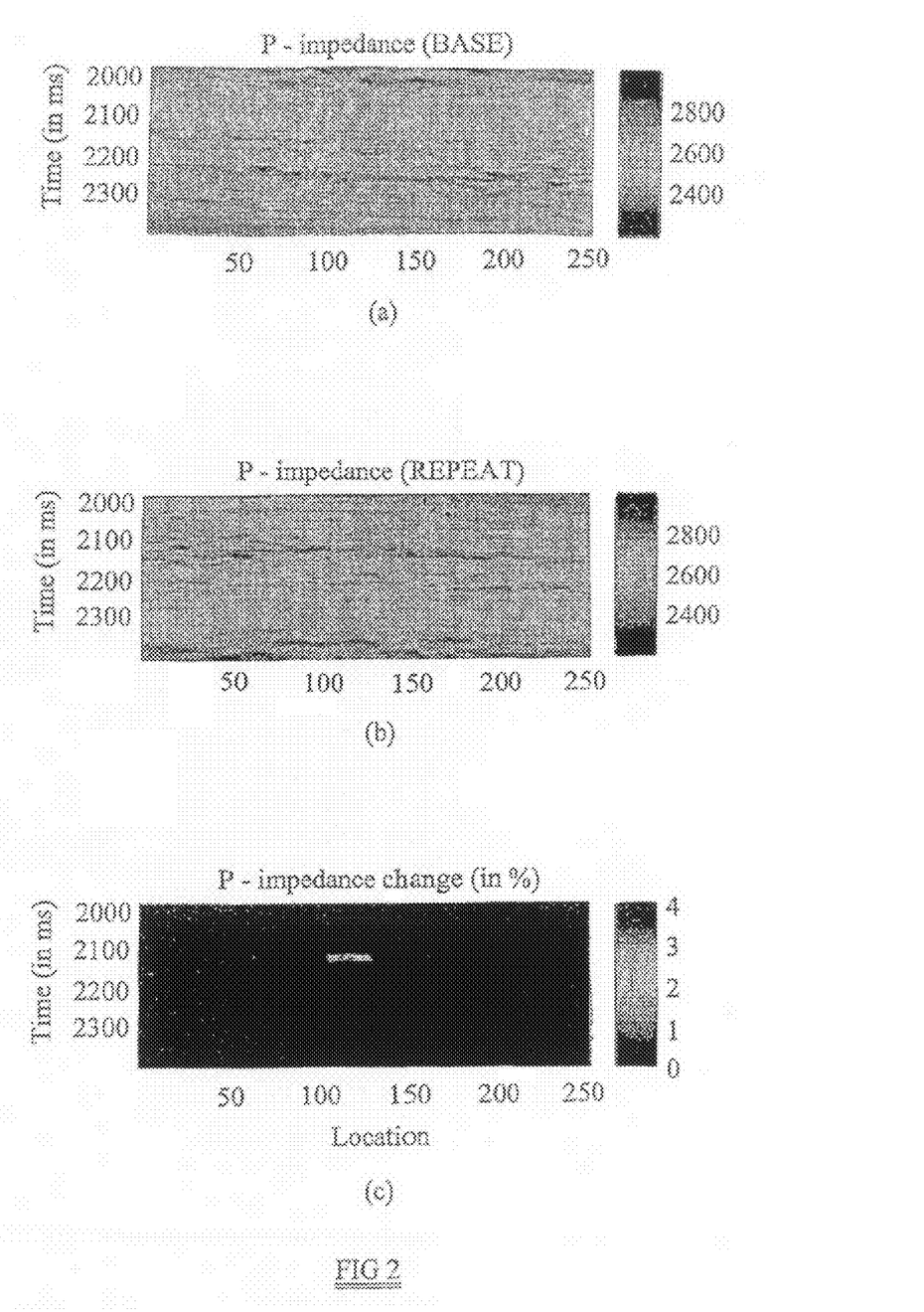
FIGS. 2a to 2c illustrate a reservoir model.

A reservoir model is defined by acoustic impedance models for the baseline and repeat seismic surveys, illustrated in FIGS. 2a and 2b. The reservoir is originally saturated by oil, but during production regions of the reservoir are water-flushed. The drainage is modelled by an increase of the acoustic impedance. The percentage change in acoustic impedance is illustrated in FIG. 2c, where the brighter-coloured region indicates the region where the physical properties have changed.

Figure 3:
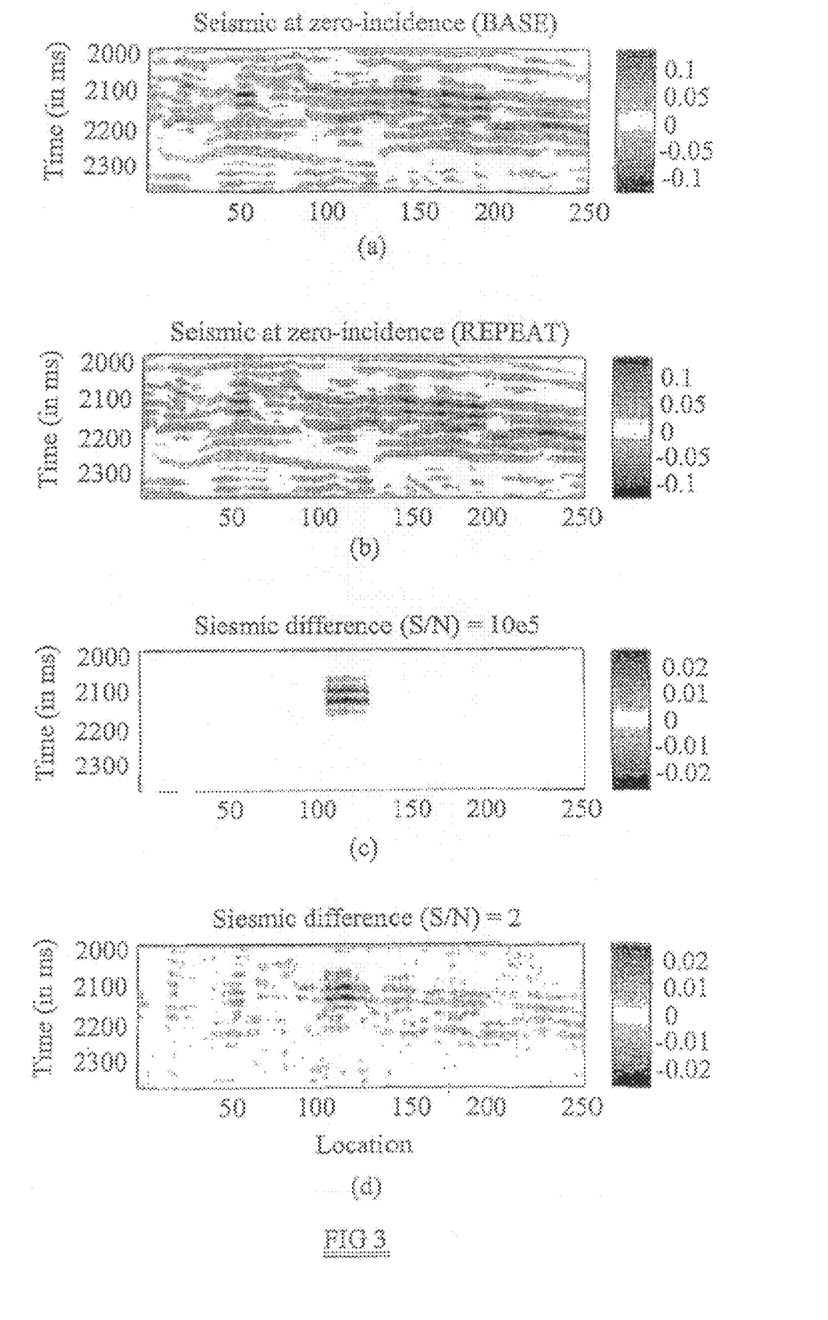
FIGS. 3a to 3d illustrate modelled seismic data for first and second surveys and their associated noise characteristics.

For each of the baseline and repeat models, a seismic forward modelling is performed by convolution. The wavelet is a Ricker wavelet with a 25 Hz centre frequency and normalised amplitude. The modelled results $s_1$ and $s_2$ are shown in FIGS. 3a and 3b respectively. A combination of coloured noise $e_1$ and white noise $e_2$ of the form $e = s_1 * e_1 + e_2$ was added to the difference data d. The coloured noise represents coherent noise, for example a non-repeatability of the source energy between the baseline and repeat surveys. The white noise is Gaussian with a variance of $\sigma_2^2$. The seismic difference was simulated with signal-to-noise ratios of $S/N = 10^5$ and 2, shown in FIGS. 3c and 3d respectively.

To test the inversion method, a stationary prior distribution is assumed, i.e.

$$\mu_\delta(x, t) = E\left\{\ln\left[\frac{Z_{P,2}(x, t)}{Z_{P,1}(x, t)}\right]\right\} = 0,$$

which corresponds to a constant acoustic impedance between surveys. A stationary covariance function with $\sigma_\delta^2 = 0.039$ is also assumed, corresponding to a 0.95 prior model interval of ±8% acoustic impedance change, which widely includes the modelled increase of about 2-4%. The noise covariance and the wavelet used in the inversion are consistent with the model.

Figure 4:
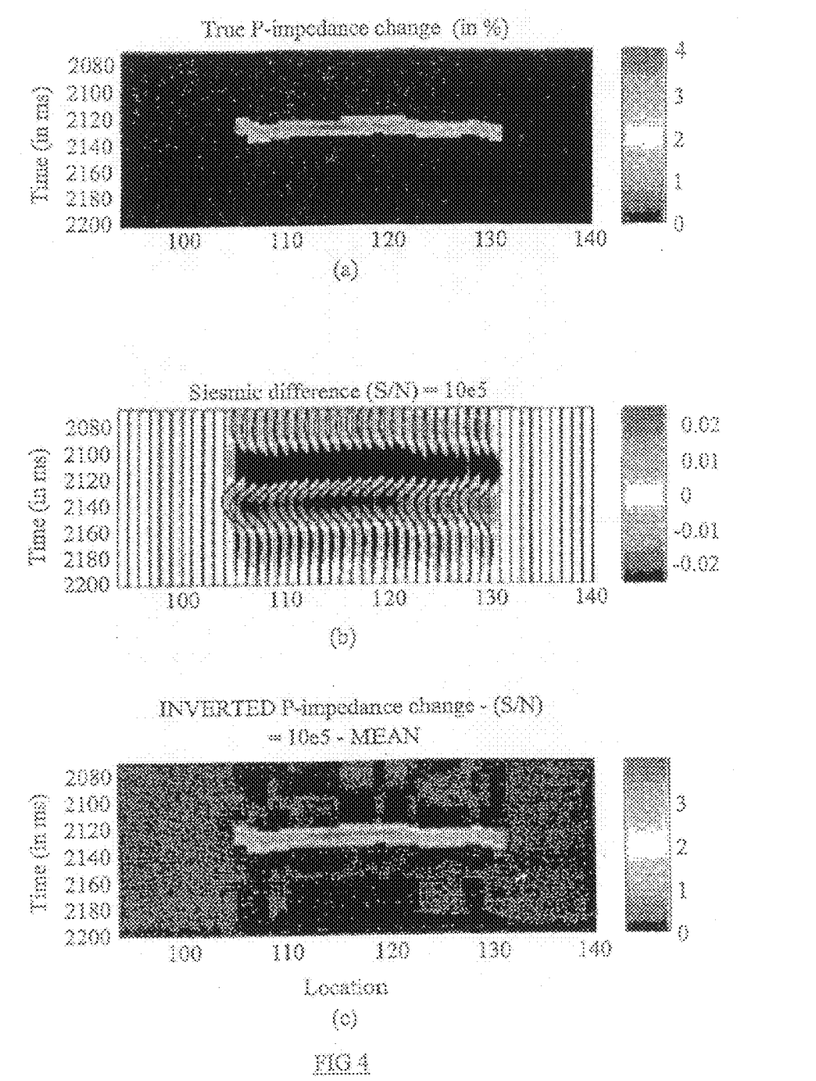
FIGS. 4a to 4c and 5a to 5c illustrate the results of an example of the method of FIG. 1.

The result of inversion of the difference data with a S/N ratio of $10^5$ is shown in FIGS. 4a to 4c, where FIG. 4a is the true model, FIG. 4b is a waveform representation of the seismic difference data, and FIG. 4c shows the posterior mean solution. With this low noise level the acoustic impedance change is retrieved almost exactly, with low uncertainty.

Figure 5:
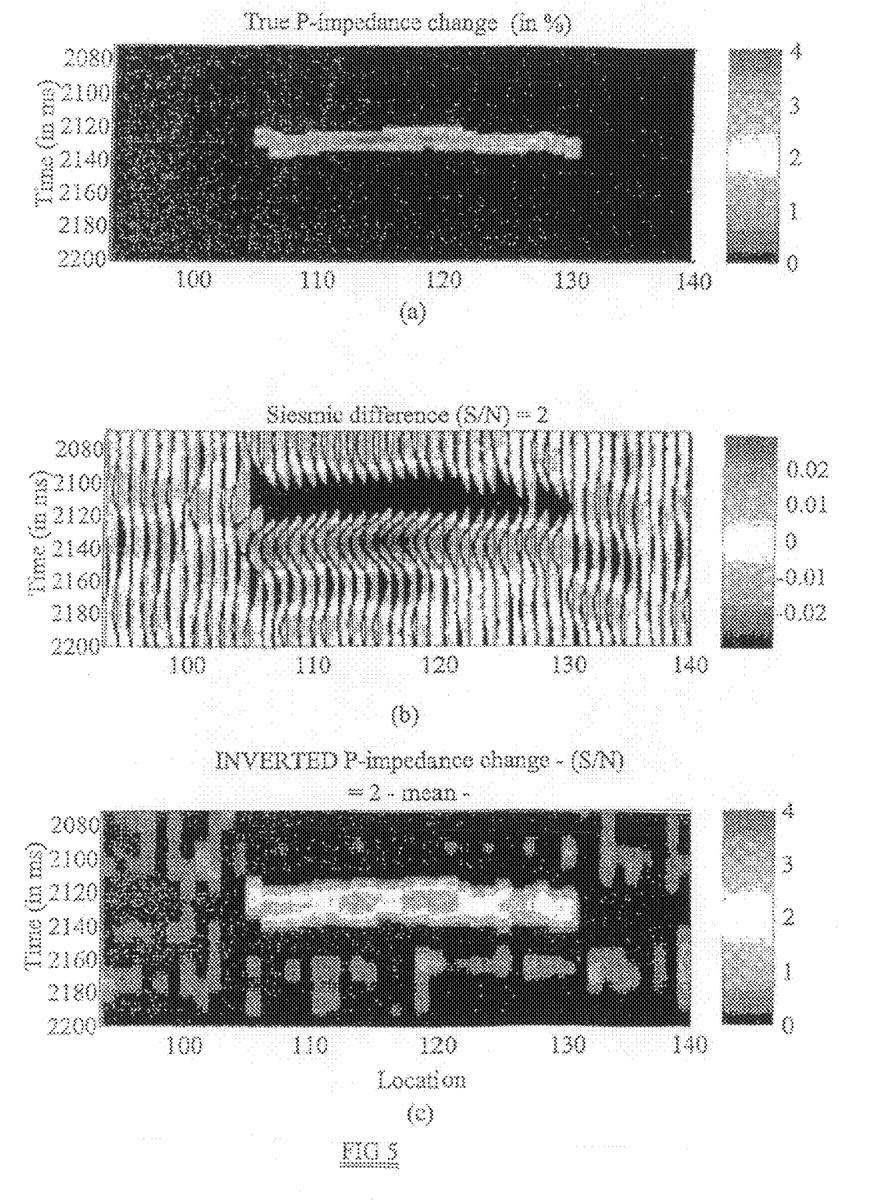

The result of inversion of the difference data with a S/N ratio of 2 is shown in FIGS. 5a to 5c, where FIG. 5a is the true model, FIG. 5b is a waveform representation of the seismic difference data, and FIG. 5c shows the posterior mean solution. The solution is smoother and has higher uncertainty that that of FIG. 4c.

Figure 6:
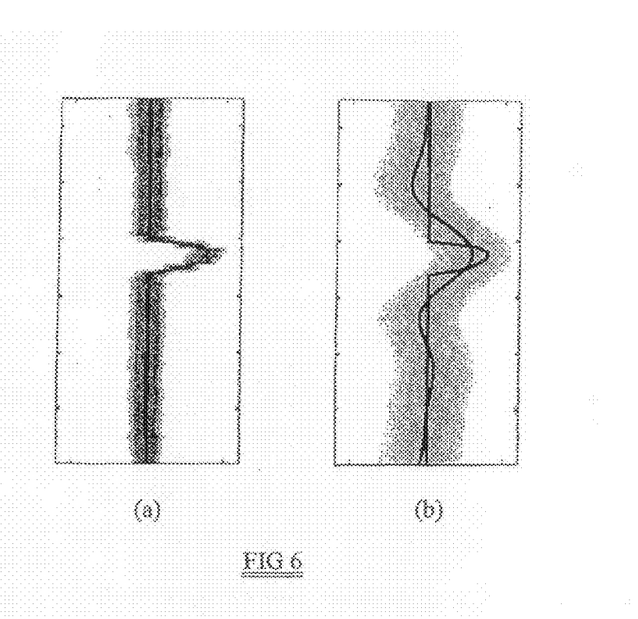
FIG. 6 illustrates the uncertainties in the results illustrated in FIGS. 4a to 4c and 5a to 5c.

The uncertainties of the inversion results at CDP 115 are shown in FIG. 6a for the low noise case (S/N=$10^5$), and in FIG. 6b for the high noise case (S/N=2). The confidence region in FIG. 6b is much wider than in FIG. 6a, as would be expected.

Figure 7:
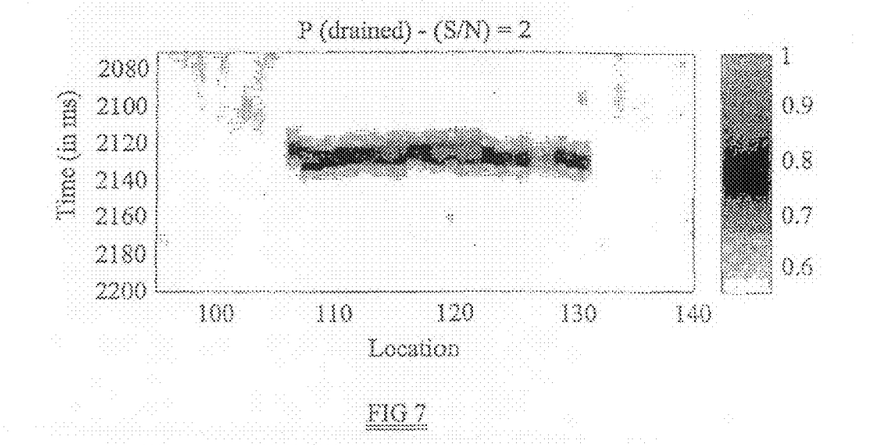
FIG. 7 is a probability map derived from the results of FIGS. 5a to 5c.

Based on the uncertainty bounds of the inversion results, it is possible to provide quantitative probabilities of different reservoir states, e.g. drained, undrained, amount of vertical change of a hydrocarbon contact. The probabilities can be used in risk value estimation and commercial decisions. In this example, FIG. 7 illustrates a probability density map of drained regions (with S/N=2), where darker colouring indicates a higher probability of having been drained. This corresponds very well to the modelled case of FIG. 2c.

The data inversion methods described above may be embodied in a program for controlling a computer to perform the inversion. The program may be stored on a storage medium, for example hard or floppy discs, CD or DVD-recordable media or flash memory storage products. The program may also be transmitted across a computer network, for example the Internet or a group of computers connected together in a LAN.

Figure 8:
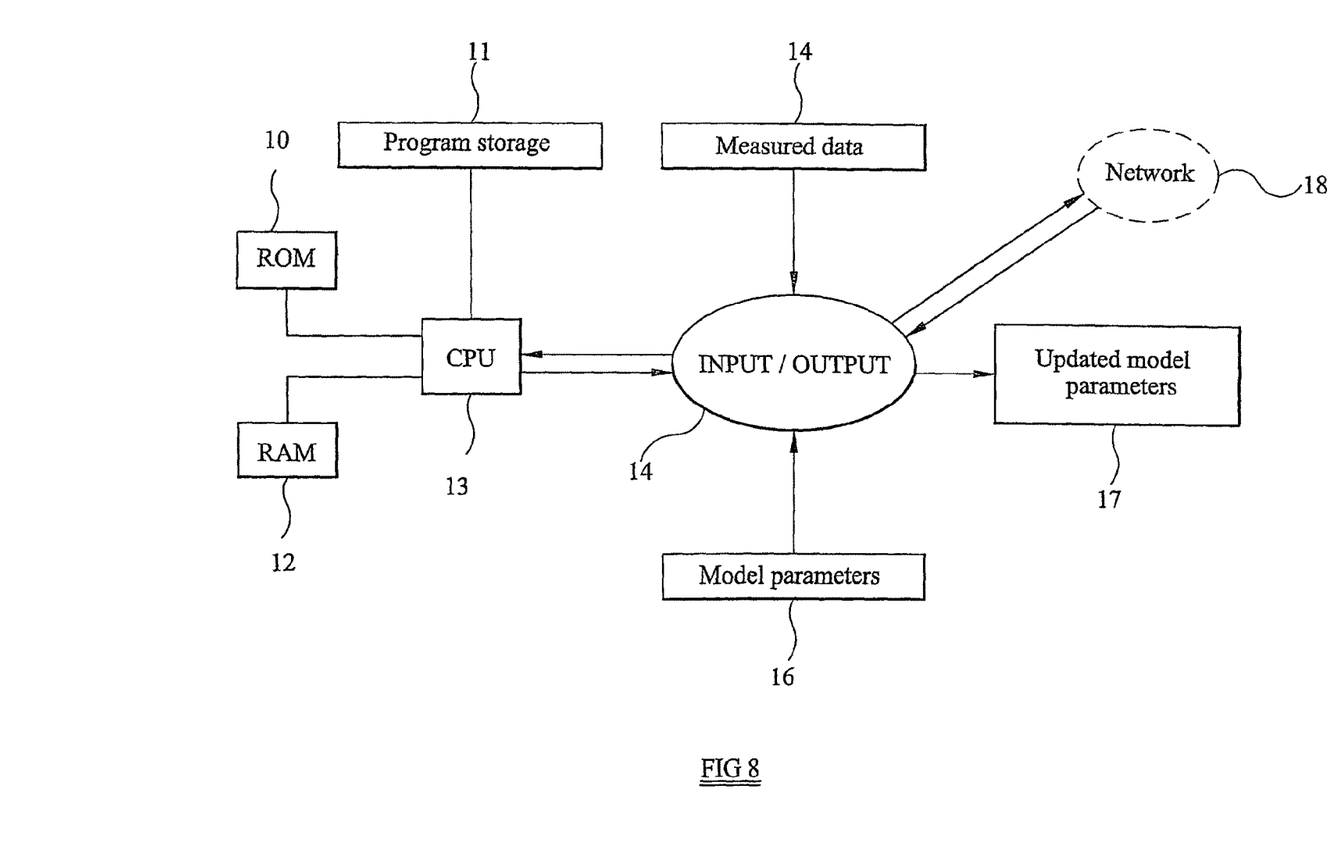
FIG. 8 is a block schematic diagram of an apparatus for performing the method of FIG. 1.

The schematic diagram of FIG. 8 illustrates a central processing unit (CPU) 13 connected to a read-only memory (ROM) 10 and a random access memory (RAM) 12. The CPU is provided with measured data 14 and model parameters 16 via an input/output mechanism 15. The CPU then performs the inversion on the provided data in accordance with the instructions provided by the program storage (11) (which may be a part of the ROM 10) and provides the output, i.e. the updated model parameters and uncertainties 17, via the input/output mechanism 15. The program itself, or any of the inputs and/or outputs to the system may be provided or transmitted to/from a communications network 18, which may be, for example, the Internet.

The invention claimed is:

1. A method of processing seismic data representing a physical system, the method comprising:
   forming a difference between first and second measurements of seismic data representing the system in first and second states, respectively; and
   inverting the difference in accordance with a parameterized model of the physical system to obtain changes in the parameters of the model.
2. A method as claimed in claim 1, wherein the first and second states represent the physical system at different times.
3. A method as claimed in claim 1, wherein the inversion is performed in a statistical environment.
4. A method as claimed in claim 3, wherein the inversion is a least squares inversion.
5. A method as claimed in claim 3, wherein the inversion is a Bayesian inversion.
6. A method as claimed in claim 4, wherein a first part of the solution to the inversion is a posterior expectation.
7. A method as claimed in claim 6, wherein the posterior expectation corresponds to changes in the parameters of the model.
8. A method as claimed in claim 4, wherein a second part of the solution to the inversion is a posterior covariance.
9. A method as claimed in claim 8, wherein the posterior covariance corresponds to the uncertainty in the posterior expectation.
10. A method as claimed in claim 1, wherein changes in the parameters of the model follow Gaussian statistics.
11. A method as claimed in claim 1, wherein the difference has an associated error model with a corresponding error term e.
12. A method as claimed in claim 11, wherein the error term e corresponds to the difference between (i) the difference between the first and second measured data, and (ii) the changes in the parameters of the model when operated upon by a forward modelling operator.
13. A method as claimed in claim 11, wherein the error term e is related to the difference d between the first and second measured data and the changes $\delta$ in the parameters of the model when operated upon by a forward modelling operator G via the matrix-vector expression $d=G\delta+e$.
14. A method as claimed in claim 11, wherein the statistical properties of the error term is described via an expectation and a covariance.
15. A method as claimed in claim 14 wherein the error term follows Gaussian statistics.
16. A method as claimed in claim 11, wherein the error term is used to determine the posterior expectation.
17. A method as claimed in claim 11, wherein the error term is used to determine the posterior covariance.
18. A method as claimed in claim 11, wherein the physical system has a part which is the same in the first and second states, measurements of this part being used to determine statistical properties of the error term.
19. A method as claimed in claim 1, wherein prior knowledge about the changes of the parameters of the model is defined in a prior model.
20. A method as claimed in claim 19, where the prior model is defined via a prior expectation and a prior covariance.
21. A method as claimed in claim 20, where the prior model follows Gaussian statistics.
22. A method as claimed in claim 19, wherein a first part of a solution to the inversion is a posterior expectation and where the prior model for the changes of the parameters of the model is used to determine the posterior expectation.
23. A method as claimed in claim 19, wherein a second part of a solution to the inversion is a posterior covariance and where the prior model for the changes of the parameters of the model is used to determine the posterior covariance.
24. A method as claimed in claim 1, wherein the seismic data are reflection data.
25. A method as claimed in claim 1, wherein the parameters of the model are any complete set of elastic properties that can be used to formulate a linear expression of reflectivity.
26. A method as claimed in claim 25, wherein the parameters of the model are the P-wave velocity, the S-wave velocity, and the density.
27. A method as claimed in claim 25, wherein the parameters of the model are the acoustic impedance, the shear impedance, and the density.
28. A method as claimed in claim 1, wherein the physical system includes a region containing a hydrocarbon reservoir.
29. A method as claimed in claim 1, wherein the obtained changes in the parameters of the model are used to assess where changes in the physical system have occurred between the first and second states.
30. A method as claimed in claim 29, wherein the obtained changes in the parameters of the model are used to assess the change in hydrocarbon content in the hydrocarbon reservoir.
31. A method as claimed in claim 1, wherein the obtained changes in the parameters of the model are used to assess the probabilities of changes in the physical system between the first and second states.
32. A method as claimed in claim 31, wherein the probabilities of changes in the physical system are used to generate a probability density map of changes in the physical system.
33. A computer-readable storage medium storing a computer program executable by a computer a computer to perform a method as claimed in claim 1.
34. A computer programmed to perform a method as claimed in claim 1.
35. An apparatus for processing data representing a physical system, the apparatus comprising:
   a computer-implemented means for forming a difference between first and second measured data representing the system in first and second states, respectively; and
   a computer-implemented means for inverting the difference in accordance with a parameterized model of the physical system to obtain changes in the parameters of the model.

* * * * *